United States Patent
Kinoshita

(10) Patent No.: US 8,264,737 B2
(45) Date of Patent: Sep. 11, 2012

(54) IMAGE FORMING APPARATUS AND CONTROL METHOD THEREFOR

(75) Inventor: Hidehiko Kinoshita, Kashiwa (JP)

(73) Assignee: Canon Kabushiki Kaisha (JP)

( * ) Notice: Subject to any disclaimer, the term of this patent is extended or adjusted under 35 U.S.C. 154(b) by 1281 days.

(21) Appl. No.: 11/945,123

(22) Filed: Nov. 26, 2007

(65) Prior Publication Data

US 2008/0123157 A1  May 29, 2008

(30) Foreign Application Priority Data

Nov. 27, 2006 (JP) .................... 2006-318656

(51) Int. Cl.
*H04N 1/393* (2006.01)
(52) U.S. Cl. ............... 358/1.2; 358/3.26; 358/451
(58) Field of Classification Search ............ 358/1.2, 358/3.26; 382/176, 256, 258, 298
See application file for complete search history.

(56) References Cited

U.S. PATENT DOCUMENTS

| | | | |
|---|---|---|---|
| 2003/0175602 A1* | 9/2003 | Kazama | 430/22 |
| 2005/0206744 A1* | 9/2005 | Ohkawara et al. | 348/222.1 |

FOREIGN PATENT DOCUMENTS

| | | | |
|---|---|---|---|
| JP | 03-258167 A | 11/1991 |
| JP | 4-288560 A | 10/1992 |
| JP | 08-130625 A | 5/1996 |
| JP | 08-214150 A | 8/1996 |
| JP | 09-055851 A | 2/1997 |
| JP | 10-149057 A | 6/1998 |
| JP | 2000-255124 A | 9/2000 |
| JP | 2002-314800 A | 10/2002 |
| JP | 2004-064288 A | 2/2004 |
| JP | 2004-351908 A | 12/2004 |
| JP | 2005-223381 A | 8/2005 |

* cited by examiner

*Primary Examiner* — Marivelisse Santiago Cordero
*Assistant Examiner* — Kent Yip
(74) *Attorney, Agent, or Firm* — Rossi, Kimms & McDowell LLP

(57) ABSTRACT

An image forming apparatus image which is capable of accurately correcting the magnification of an image without degrading the quality of the formed image or reducing productivity, to thereby make it possible to cope with an increase in the operating speed of the apparatus. The image forming apparatus is comprised of an image processing section having an image area-separating section, and an image forming section having an exposure control section. The image area-separating section separates image data into at least two kinds of areas. The exposure control section performs magnification correction on at least one area of the image data separated by the image area-separating unit.

4 Claims, 14 Drawing Sheets

CONFIGURED TO HAVE INFORMATION ON
CYAN, MAGENTA, YELLOW, BLACK,
AND ATTRIBUTE,
ON A PIXEL-BY-PIXEL BASIS

*FIG.7*

| CYAN | ATTRIBUTE | MAGENTA | ATTRIBUTE | YELLOW | ATTRIBUTE | BLACK | ATTRIBUTE |
|---|---|---|---|---|---|---|---|
| 8 BITS | 2 BITS | 8 BITS | 2 BITS | 8 BITS | 2 BITS | 8 BITS | 2 BITS |

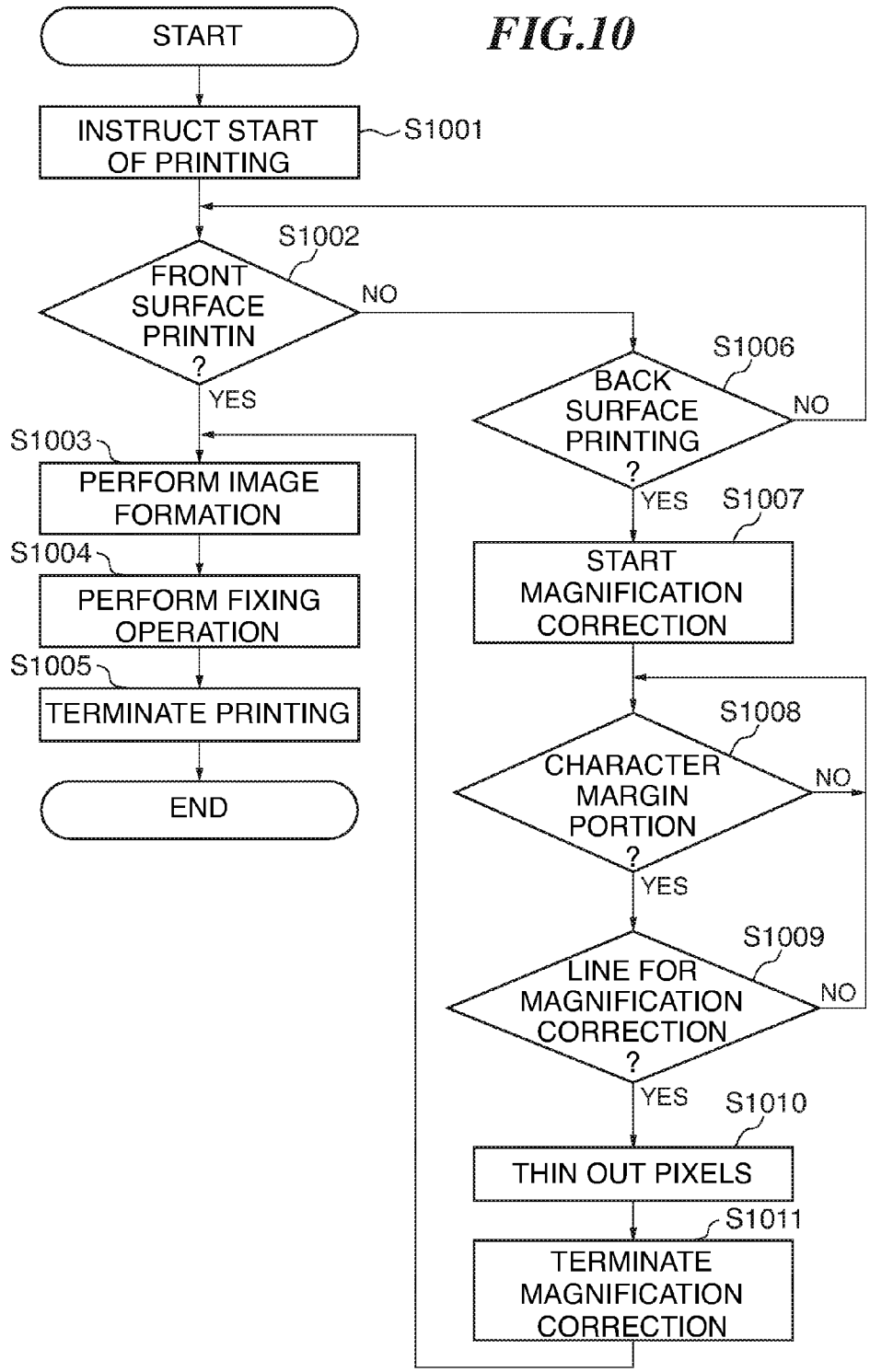

FIG.11A
100% MAGNIFICATION    REDUCTION PRINTING
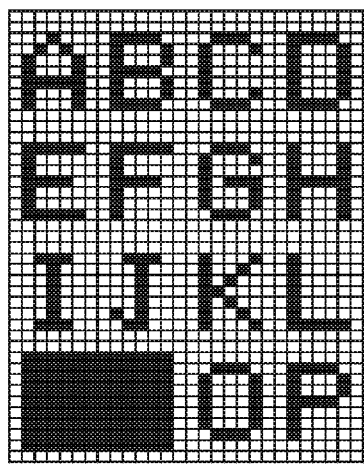 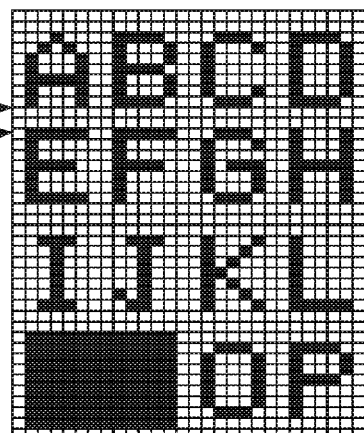
FIG.11B
100% MAGNIFICATION    ENLARGEMENT PRINTING
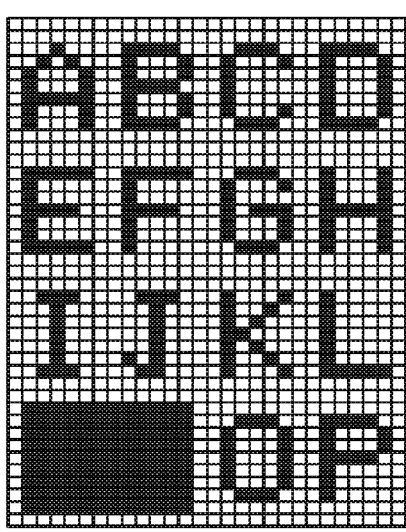 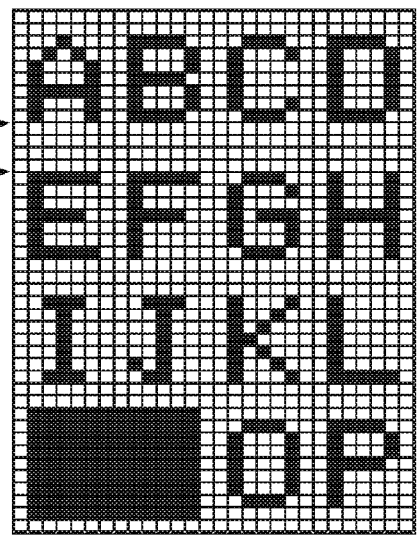

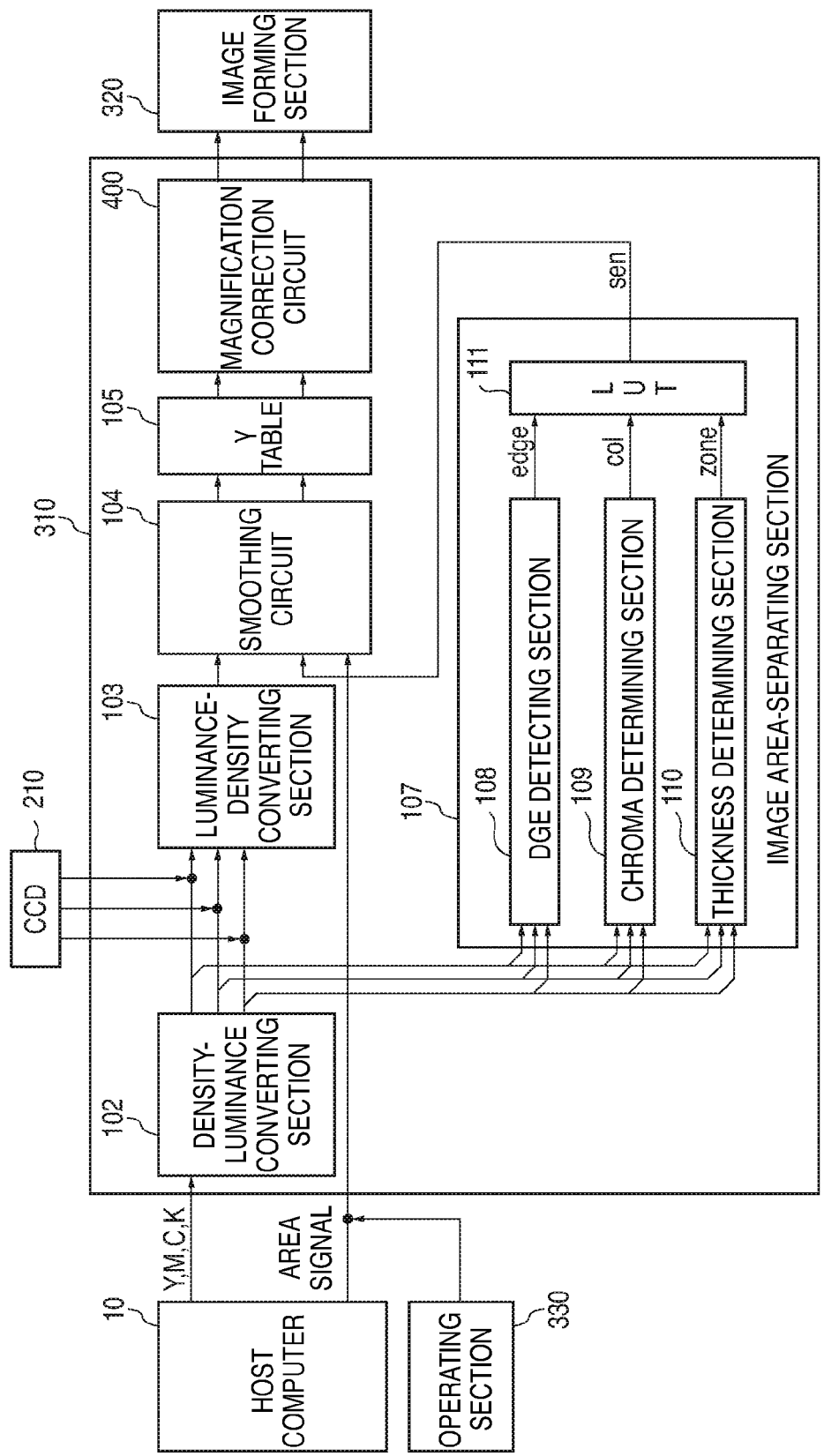

IMAGE FORMING APPARATUS AND CONTROL METHOD THEREFOR

BACKGROUND OF THE INVENTION

1. Field of the Invention

The present invention relates to an image forming apparatus that performs image formation by an electrophotographic method, and a control method therefor.

2. Description of the Related Art

Conventionally, in the field of an electrophotographic image forming apparatus that performs image formation by executing the steps of charging, exposing, developing, transferring, and fixing, a technique (heat fixing method) is known in which an unfixed toner image transferred onto a recording sheet is heated and fused for fixing. The heat fixing method include not only a sheet heater method and an infrared lamp method, but also a fixing roller method, which is currently most widely used, and an IH (Introduction Heating) fixing method.

In an image forming apparatus that fixes a toner image on a recording sheet by the above heat fixing method, the recording sheet shrinks after the toner image has been fixed, since moisture contained in the recording sheet is evaporated by heat during heat fixation. The recording sheet for use is generally different in characteristics and properties, depending on the use (one-side printing or both-sided printing), conditions (humidity and temperature) in which the apparatus is used, thickness, hardness, and the maker which made the sheet. The ratio of shrinkage (shrinkage ratio) is different depending on the kind and thickness of the recording sheet. It is empirically known that once the recording sheet shrinks due to heat fixation, it takes a predetermined time period (approximately 15 to 20 minutes) for the recording sheet to absorb moisture in the air to return to its original size.

In general, however, when images are formed on both sides of a recording sheet, a toner image is transferred onto one surface (front surface) of the recording sheet for heat fixation, whereafter another toner image is transferred onto the other surface (back surface) of the recording sheet, and then is heat-fixed again. Therefore, when the other toner image is transferred onto the back surface of the sheet after the toner image is transferred onto the front surface thereof, the other toner image is transferred onto the sheet in a shrunk state. This causes the problem that the images on the front surface and back surface of the recording sheet are different in size. Therefore, it is required to adjust the position of the recording sheet for image formation thereon with high accuracy according to the amount of heat-caused shrinkage. To this end, it is a general practice to change the magnification of the image according to the change in the size of the recording sheet. For example, there has been proposed an invention in which the image magnification is changed by controlling the rotational speed of the scanner motor, to thereby correct displacement of the position of the sheet for image formation.

For example, Japanese Laid-Open Patent Publication (Kokai) No. H04-288560 and Japanese Laid-Open Patent Publication (Kokai) H10-149057 proposes a technique of detecting vertical size and horizontal size of a recording sheet by an optical sensor in a conveying path, calculating the vertical and horizontal expansion/contraction ratios of the recording sheet based on results of the detection, and controlling the scanning speed of a scanning optical system based on the expansion/contraction ratios of the recording sheet to thereby change magnification of the image.

Further, Japanese Laid-Open Patent Publication (Kokai) No. 2004-351908, for example, discloses a technique of controlling the length between image data by adding an image clock for use in transferring the image data at a desired point to thereby perform the magnification correction in a main scanning direction (perpendicular to the image reading direction and is along the longitudinal direction of the photosensitive member as an image carrier), to thereby correct the image size of an image to be printed.

According to the above-described prior art, the magnification of an image to be formed is changed by switching the rotational speed of the scanner motor, and hence the rotational speed of the scanner motor is changed at intervals between adjacent pages (intervals between adjacent recording sheets) to thereby perform image formation on a page-by-page basis. In this case, during changing of the rotational speed of the scanner motor (during switching the speed), the image formation cannot be started, and hence a next image formation cannot be executed until a change in the rotational speed is completed (the speed has been switched). Although depending on the type of the scanner motor, for example, it takes about several hundred msec. to complete changing of the speed after starting the same. When the scanning speed of the scanning optical system of the image forming apparatus is switched, it takes long time before the scanning speed becomes stable after it is changed. This causes a reduced print speed to degrade productivity of the image forming apparatus, when a sheet-to-sheet interval (conveying intervals of sheets which are conveyed to the transfer position) is short. Further, it is necessary to control the sheet-to-sheet interval such that a time period taken before the scanning speed becomes stable is ensured, which makes it impossible to cope with an increase in the operating speed of the image forming apparatus.

Further, a change in the image clock for transferring the image data is can only corrects the magnification of the image data in a main scanning direction (direction orthogonal to the image reading direction). Therefore, to cope with correction of the magnification in a sub scanning direction (image reading direction), it is necessary to combine the above-described technique with the corrections of the magnification disclosed in Japanese Laid-Open Patent Publication (Kokai) No. H04-288560, and Japanese Laid-Open Patent Publication (Kokai) No. H10-149057. In this case, the rotational speed of the scanner motor is switched, and hence, similarly to the above, there arises the problem that the productivity is lowered due to a decreased in the print speed, and it is impossible to cope with an increase in the operating speed of the image forming apparatus.

SUMMARY OF THE INVENTION

The present invention provides an image forming apparatus which is capable of accurately correcting the magnification of an image without degrading the quality of the formed image or reducing productivity, to thereby make it possible to cope with an increase in the operating speed of the apparatus, and a control method therefor.

In a first aspect of the present invention, there is provided an image forming apparatus that performs image formation by transferring an image formed on an image carrier based on image data onto a recording medium, and heat-fixing the image thereon, comprising an image area-separating unit configured to separate the image data into at least two kinds of areas, and a magnification correcting unit configured to correct magnification of at least one area of the image data separated by the image area-separating unit.

With the configuration of the image forming apparatus according to the first aspect of the present invention, the magnification correction is performed on at least one area of the image data separated by the image area-separating unit, and hence it is possible to accurately correct the magnification of an image without degrading the quality of the formed image or reducing productivity, to thereby make it possible to cope with an increase in the operating speed of the apparatus.

The image area-separating unit can separate the image data into at least two kinds of areas including a character portion, a photograph portion, a fine line portion, a graphic, a table, a graph, and a background.

The image area-separating unit includes a margin-determining unit configured to determine whether the image data is of a character portion containing a character edge portion and an inside of a character, or of a margin portion not containing the character.

The magnification correcting unit can perform the magnification correction on the margin portion determined by the margin-determining unit of the image area-separating unit, by thinning lines or pixels from the margin portion on a line-by-line basis or a pixel-by-pixel basis or inserting lines or pixels into the margin portion on a line-by-line basis or a pixel-by-pixel basis such that the magnification becomes equal to a specified value.

The image forming apparatus further comprises a calculation unit configured to calculate an expansion/contraction ratio of the recording medium based on a size of the recording medium before the image is heat-fixed on the recording medium, and the size of the recording medium after the image has been heat-fixed on the recording medium, and the magnification correcting unit performs the magnification correction based on the expansion/contraction ratio calculated by the calculation unit.

In a second aspect of the present invention, there is provided an image forming apparatus that performs image formation by transferring an image formed on an image carrier based on image data onto a recording medium, and heat-fixing the image thereon, comprising a determination unit configured to determine whether or not the image data exists, and a magnification correction unit configured to perform magnification correction on a portion which has been determined by the determination unit that the portion does not have the image data.

The magnification correction unit performs the magnification correction on the portion which has been determined by the determination unit that the portion does not have the image data, by thinning lines or pixels from the portion on a line-by-line basis or a pixel-by-pixel basis or inserting lines or pixels into the portion on a line-by-line basis or a pixel-by-pixel basis such that the magnification becomes equal to a specified value.

The image forming apparatus further comprises a calculation unit configured to calculate an expansion/contraction ratio of the recording medium based on a size of the recording medium before the image is heat-fixed on the recording medium, and the size of the recording medium after the image has been heat-fixed on the recording medium, and the magnification correcting unit can perform the magnification correction based on the expansion/contraction ratio calculated by the calculation unit.

In a third aspect of the present invention, there is provided a method of controlling an image forming apparatus that performs image formation by transferring an image formed on an image carrier based on image data onto a recording medium, and heat-fixing the image thereon, comprising an image area-separating step of separating the image data into at least two kinds of areas, and a magnification correction step of performing magnification correction on at least one area of the image data separated by the image area-separating step.

In a fourth aspect of the present invention, there is provided a method of controlling an image forming apparatus that performs image formation by transferring an image formed on an image carrier based on image data onto a recording medium, and heat-fixing the image thereon, comprising a determination step of determining whether or not the image data exists, and a magnification correction step of performing magnification correction on a portion which has been determined in the determination step that the portion does not have the image data.

The features and advantages of the invention will become more apparent from the following detailed description taken in conjunction with the accompanying drawings.

BRIEF DESCRIPTION OF THE DRAWINGS

FIG. 7 is a view of the arrangement of image data of each pixel and attribute data of the image data.

FIG. 10 is a flowchart of a magnification correction process executed by the image forming apparatus.

FIG. 11A is a view which is useful in explaining the magnification correction carried out when the size of an image is reduced.

FIG. 11B is a view which is useful in explaining the magnification correction carried out when the size of an image is increased.

FIG. 12 is a block diagram of a variation of the image processing section of the image forming apparatus, and associated parts.

DETAILED DESCRIPTION OF THE PREFERRED EMBODIMENTS

The present invention will now be described in detail below with reference to the accompanying drawings showing preferred embodiment thereof.

Figure 1:
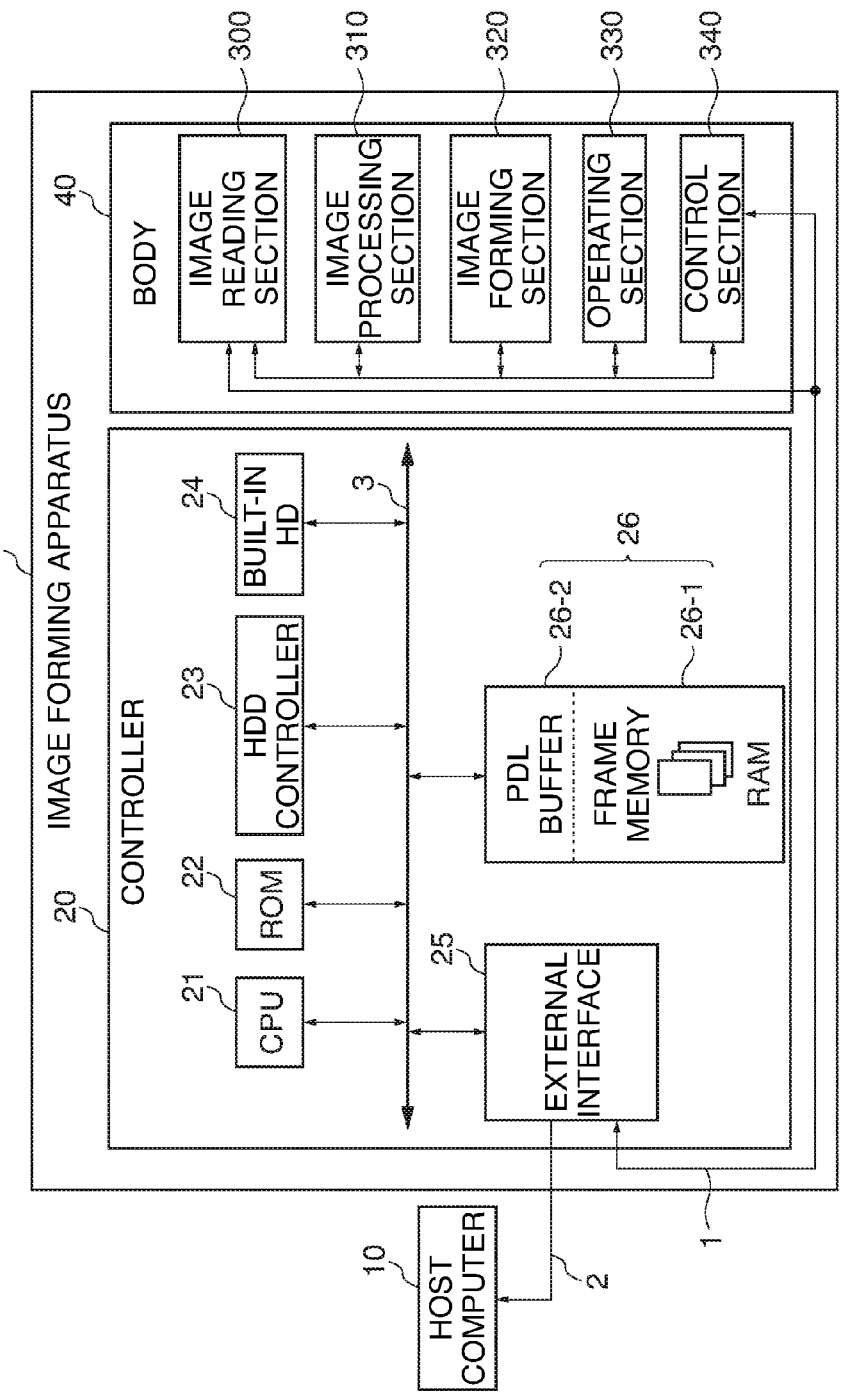
FIG. 1 is a block diagram of an image processing system according to a first embodiment of the present invention.

FIG. 1 is a block diagram of an image processing system according to a first embodiment of the present invention.

Referring to FIG. 1, the image processing system is comprised of an image forming apparatus (image output apparatus) 30 including a main unit 40 and a controller 20, and a host computer 10. The main unit 40 and the controller 20 of the image forming apparatus 30 are connected to each other by a cable 1, and the controller 20 and the host computer 10 thereof are connected to each other by a cable 2. It should be noted that any of general-purpose cables, such as parallel cables, SCSI (Small Computer System Interface) cables, serial cables, and network cables, and dedicated cables may be used for the cables 1 and 2.

The image forming apparatus 30 is comprised of an image reading section 300, an image processing section 310, an image forming section 320, an operating section 330, and a control section 340. The controller 20 is comprised of a CPU 21, a ROM 22, an HDD (Hard Disk Drive) controller 23, a built-in HD 24, an external interface 25, and a RAM 26. The host computer 10 is an information processing unit serving as a supply source of print data (which is described as PDL data in the present embodiment), and includes known component elements (a CPU, a ROM, a RAM, an HDD, a display, etc.).

The controller 20 temporarily holds PDL data, which is supplied from the host computer 10 via the cable 2 and the external interface 25, in the built-in HD 24 via the HDD controller 23. Further, the controller 20 temporarily holds the PDL data held in the built-in HD 24, in a PDL buffer 26-2 of the RAM 26 via a CPU bus 3. It should be noted that the controller 20 generates full-color image data or grayscale image data based on the PDL data supplied from the host computer 10.

Further, the controller 20 loads the PDL data held by the PDL buffer 26-2 in a frame memory 26-1 of the RAM 26, for generation of image data. Further, the controller 20 transfers the image data loaded in the frame memory 26-1 to the main unit 40 of the image forming apparatus 30, via the cable 1. Thus, an image is formed (printed) on a recording sheet by the image forming section 320. Further, the controller 20 is capable of not only obtaining various kinds of information including status information of the image forming apparatus 30 via the cable 1 and transmitting the same to the host computer 10 but also controlling the image forming apparatus 30 based on the status information.

The CPU 21 of the controller 20 operates based on control programs, for control of the functions of the controller 20. The ROM 22 stores the control programs. The built-in HD 24 has a region for temporarily holding already printed PDL data and image data generated by loading PDL data in the frame memory 26-1, a region that stores font data, and so forth, and is connected to the CPU bus 3 via the HDD controller 23. The RAM 26 includes the PDL buffer 26-2 for temporarily holding PDL data received from the host computer 10, and the frame memory 26-1 for temporarily holding image data obtained by loading the PDL data.

It is also effective that the ROM 22 is formed e.g. by a programmable memory (e.g. EEPROM) such that control programs can be installed therein from the host computer 10. Further, the ROM 22 can also be effectively formed e.g. by a recording medium, such as a floppy (registered trademark) disk or a CD-ROM, and a controller (driver) therefor. It should be noted that a recording medium (e.g. the ROM 22) which has control programs stored therein in a state readable by the CPU 21 constitutes the present invention.

Image data is transmitted from the controller 20 to the image forming apparatus 30 via the cable 1. The image forming apparatus 30 is configured such that it can form an image by an electrophotographic method, and output a full-color image. The image forming apparatus 30 serves not only as a printer that forms an image on a recording sheet based on PDL data generated by the host computer 10 but also as a copying machine that copies an image of an original on a recording sheet, and a scanner.

The image processing section 310 of the image forming apparatus 30 generates CMYK data (K data for grayscale) based on the image data supplied from the controller 20, and supplies the CMYK data to the image forming section 320. The image reading section 300 reads an image from an original. The image forming section 320 forms an image on a recording sheet based on the data supplied from the image processing section 310. Further, the image forming section 320 forms an image on a recording sheet based on the image data read from the original by the image reading section 300. The image forming section 320 has the function of outputting a color image or a grayscale image having a resolution of e.g. 400 dpi.

The operating section 330 is used when instructions are given to the image forming apparatus 30. The control section 340 controls the operation of the image forming apparatus 30 based on control commands from the CPU 21 of the controller 20 or the instructions input from the operating section 330. Further, the control section 340 carries out a magnification correction process described hereinafter with reference to FIG. 10, based on the control programs.

Figure 2:
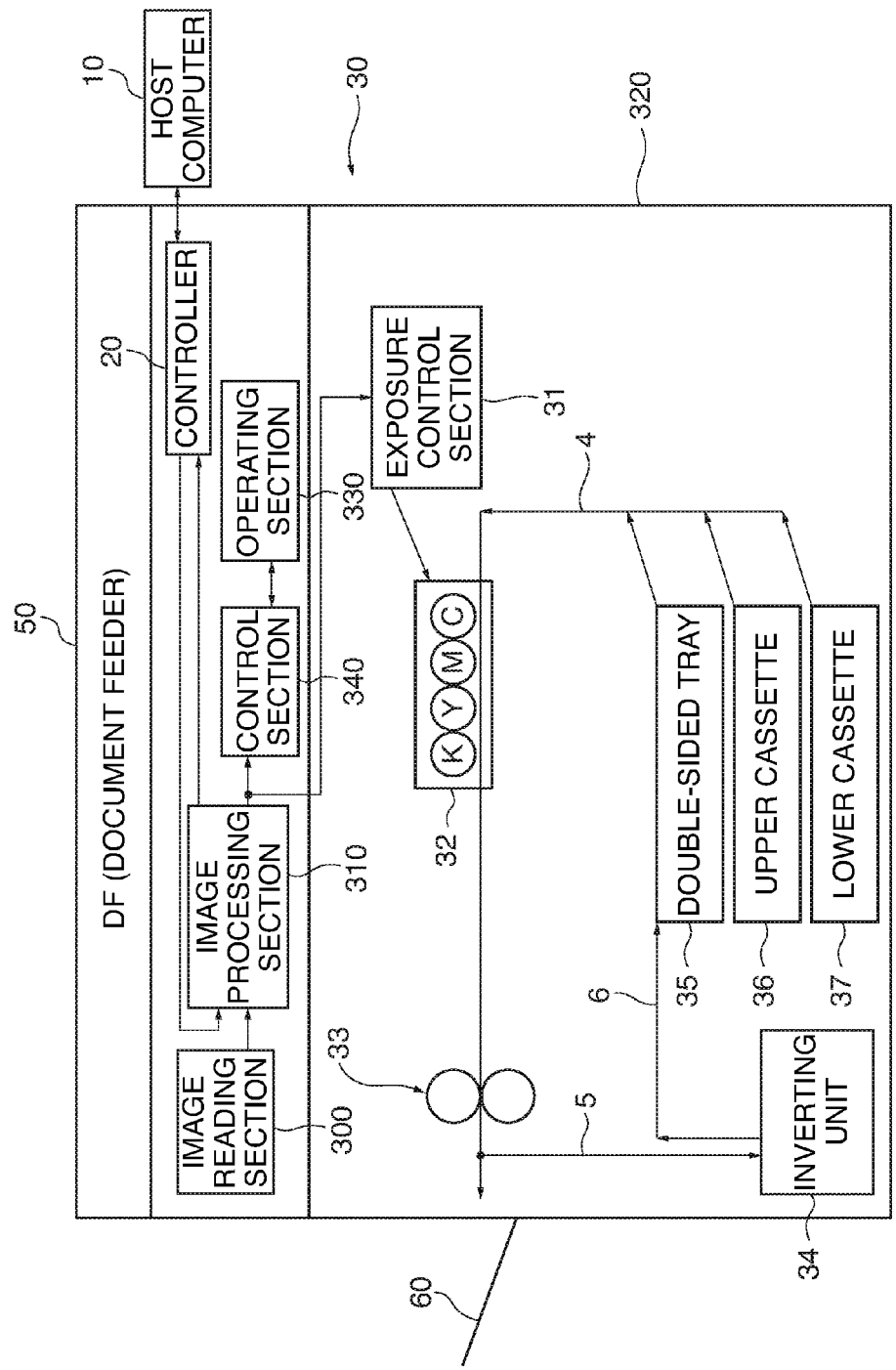
FIG. 2 is a block diagram of an image forming apparatus.

FIG. 2 is a block diagram of the image forming apparatus.

As shown in FIG. 2, the main unit 40 of the image forming apparatus 30 is equipped with a DF (Document Feeder) 50 and a discharge tray 60. The DF 50 sequentially conveys a plurality of originals stacked at a predetermined location one by one to an original reading position. The image reading section 300, which is formed by an optical system for scanning each original, a color CCD, and so forth, reads the original set at the original reading position by the DF 50 or manually, generates RGB data corresponding to an image of the original, and sends the RGB data to the image processing section 310.

The image processing section 310 selects either of image data sent from the controller 20 and image data sent from the image reading section 300 under the control of the control section 340, and transmits the selected image data to the image forming section 320 and the controller 20. More specifically, the control section 340 selects image data supplied from the controller 20 when it uses the image forming apparatus 30 as a printer, and selects image data supplied from the image reading section 300 when it uses the image forming apparatus 30 as a copying machine.

The image processing section 310 converts input RGB data into YMCK data, and supplies image data of C, M, Y and K to an exposure control section 31 of the image forming section 320. The exposure control section 31 converts the supplied image data of C, M, Y and K into laser beams, and causes the laser beams to scan on a photosensitive drum 32, to thereby form a latent image thereon. A recording sheet for use in forming an image is fed by selecting an upper cassette 36 or a lower cassette 37, and is conveyed to a transfer position opposed to the photosensitive drum 32 by way of a conveying path 4.

The latent image on the photosensitive drum 32 is developed by toner by a developing device, not shown. This forms a toner image on the photosensitive drum 32 as a visual image, which is transferred onto the sheet. The operations for forming a latent image on the photosensitive drum 32, developing the latent image on the photosensitive drum 32, and transferring the toner image from the photosensitive drum 32 onto the recording sheet are performed for each of the C, M, Y, and K colors. Thus, toner images (color images) of the respective colors are synthesized on the recording sheet to form a toner image (color image) thereon.

The recording sheet having the toner image transferred thereon is conveyed to a fixing device 33, which fixes the toner image on the recording sheet. After that, the recording sheet is discharged onto the discharge tray 60 in a single sided recording mode for forming an image on one side of the recording sheet. On the other hand, in a double-sided recording mode for forming images on both sides of the recording sheet, after termination of transfer of the toner image onto one surface of the recording sheet, the recording sheet is sent via a conveying path 5 to an inverting unit 34, where it is inverted. Then, the recording sheet is conveyed by way of a conveying path 6 and a double-sided tray 35 along the conveying path 4 again. The recording sheet has a toner image transferred onto the other surface thereof and then fixed by the fixing device 33, and then it is discharged onto the discharge tray 60.

Figure 3:
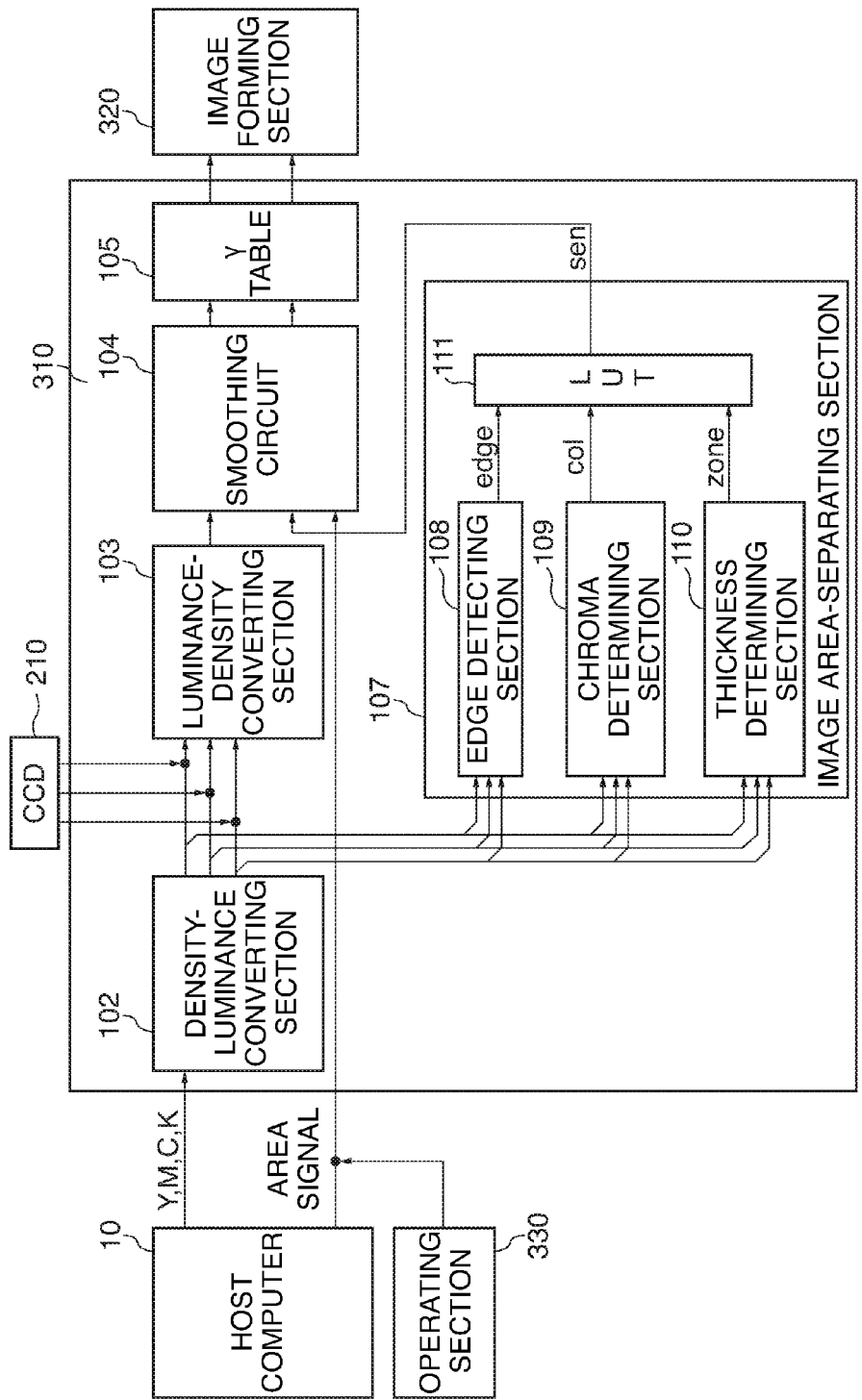
FIG. 3 is a block diagram of an image processing section of the image forming apparatus, and associated parts.

FIG. 3 is a block diagram of the image processing section 310 of the image forming apparatus, and associated parts.

As shown in FIG. 3, the image processing section 310 is comprised of a density-luminance converting section 102, a luminance-density converting section 103, a smoothing circuit 104, a γ table 105, and an image area-separating section 107. The image signals of Y, M, C, and K delivered from the host computer 10 are sequentially sent to the image processing section 310, each for the scanned surface of the photosensitive drum 32 of the image forming section 320.

The density-luminance converting section 102 converts the density signals of Y, M, C, and K into the luminance signals of the R, G, and B (red, green, and blue) colors on a color-by-color basis by a lookup table ROM, not shown. The luminance-density converting section 103 converts the three primary color signals of the R, G, and B colors transferred from the CCD 210 or the host computer 10 into the density signals of Y, M, C, and K, and delivers the density signals at a predetermined bit width (8 bits) in the order of the respective scanned surfaces of the photosensitive drum 32.

The image area-separating section 107 includes an edge detecting section 108, a chroma determining section 109, a thickness determining section 110, and a lookup table (LUT) 111. The edge detecting section 108 detects the edge of the image data from the image signals of Y, M, C, and K delivered from the density-luminance converting section 102, on a pixel-by-pixel basis based on information from peripheral pixels, and generates an edge signal "edge" indicative of the edge of the image data, to deliver the edge signal to the LUT 111. The chroma determining section 109 generates a chroma signal "col" from the image signals of Y, M, C, and K delivered from the density-luminance converting section 102, and delivers the chroma signals to the LUT 111. The thickness determining section 110 determines the thickness of the image data based on the image signals of Y, M, C, and K delivered from the density-luminance converting section 102, and generates a thickness signal "zone" indicative of the thickness of the image data, to deliver the thickness signal to the LUT 111. The LUT 111 outputs attribute data of an image area determining signal.

The LUT 111 determines whether image data belongs to a character portion (character/graphic) including a character edge portion and the inside of a character, a character margin portion including no character, or a photograph portion, based on features extracted by the edge detecting section 108, the chroma determining section 109, and the thickness determining section 110. Then, the LUT 111 performs a smoothing process only on the character portion by the smoothing circuit 104. This makes it possible to smooth the edge of the image data, whereby the image forming section 320 can form an excellent image. It should be noted that the image area-separating section 107 may separate the image data not only into character portions and photograph portions but also more finely into fine line (ruled line) portions, graphics, tables, graphs, and a background.

Based on the results of separation of the image data into the image areas (image area separation) by the image area-separating section 107, and area signals delivered from the operating section 330 or the host computer 10, the smoothing circuit 104 carries out the following process: The smoothing circuit 104 performs known image processing (switching between 400 lines and 800 lines) on a pixel-by-pixel basis, to generate data having a resolution twice as high as a reading resolution of the image read from the original. The, the γ table 105 converts the density data having the respective resolutions according to gradation reproduction by the image forming section 320.

Figure 4B:
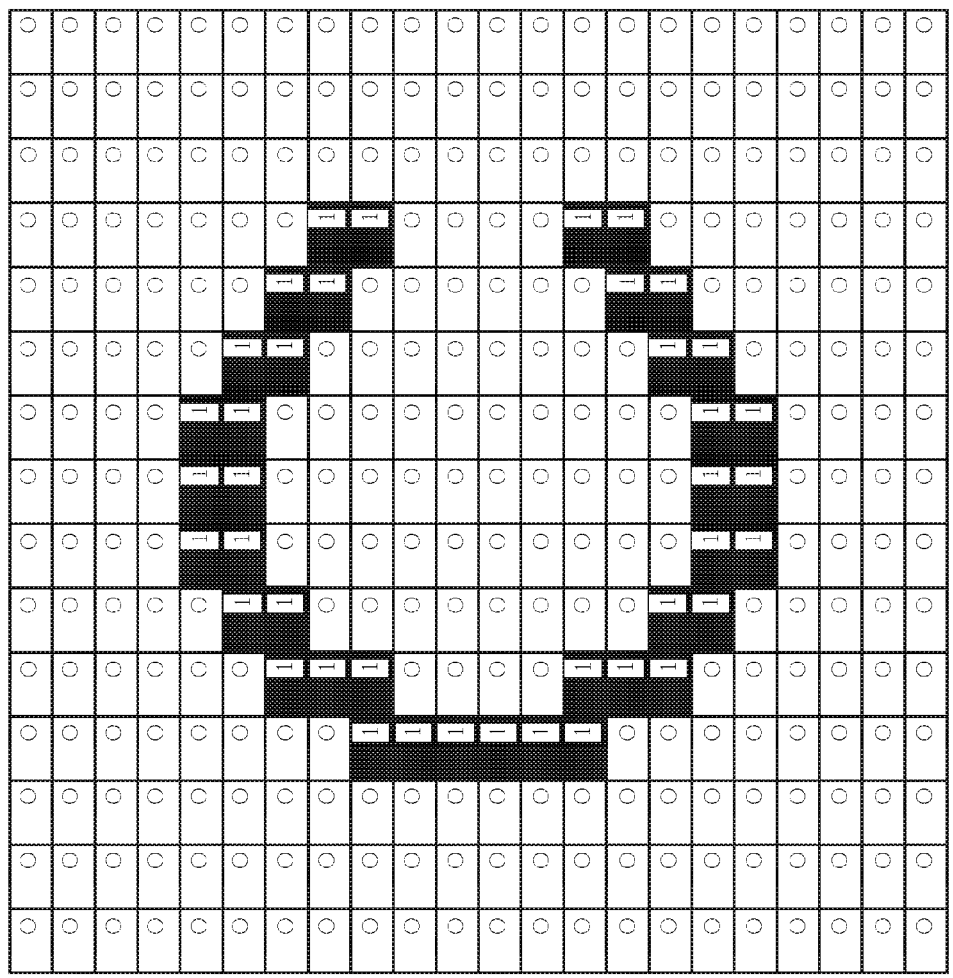
FIG. 4B is a view of an attribute map in which attribute data items are associated with respective pixels and arranged in two-dimension.

The image data of the Y, M, C, and K, and the attribute data generated by the image area separation, processed as described above, are sent from the image processing section 310 to the exposure control section 31 of the image forming section 320. When receiving the image data and the attribute data, the exposure control section 31 records densities (forms an image in accordance with the density data) by a PWM (Pulse Width Modulation) process, using a semiconductor laser, a polygon mirror, the photosensitive drum (see FIG. 8), described hereinafter, and so forth, FIG. 4A is a view showing an example of a bitmap image containing a character image, and FIG. 4B is a view of an attribute map in which attribute data items are associated with respective pixels and arranged in two-dimension.

Figure 4A:
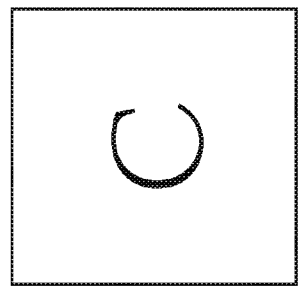
FIG. 4A is a view showing an example of a bitmap image containing a character image.

FIG. 4A shows a bitmap image containing "C" as a character image. Now, let it be assumed that in the attribute map of attribute data generated by the image area-separating section 107, pixels of the character image are represented by 1, and pixels of the character margin portion are represented by 0. In this case, as shown in FIG. 4B, an attribute map is formed in which 0 and 1 associated with the respective colors are arranged in two-dimension. Further, similarly to the character pixels, photograph pixels as well have attribute data imparted thereto, and an attribute map is formed in which attribute data of character portions and attribute data of photograph portions are integrated.

Figure 5:
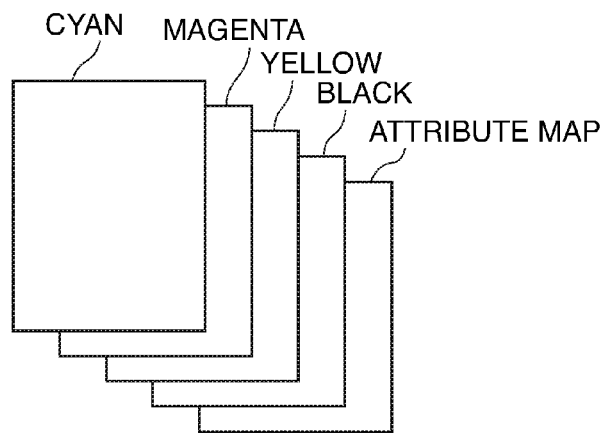
FIG. 5 is a view of illustrating the concept of storing five planes formed by adding a plane of the attribute map to the planes of C, M, Y and K, as an image of one page.

The attribute map may be configured as desired insofar as attribute data items can be stored in a memory, not shown, in a manner associated with respective pixels. For example, the attribute map may be configured as such a plane shown in FIG. 4B, and image data and the attribute map may be separately stored in a memory. In this case, as shown in FIG. 5, five planes formed by adding the plane of the attribute map to the respective planes of C, M, Y and K are held as an image of one page.

Figure 6:
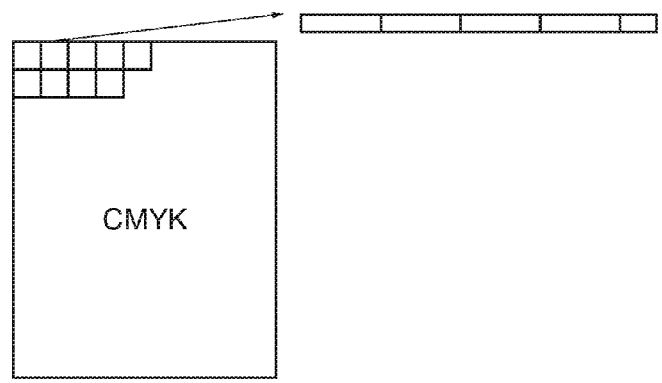
FIG. 6 is a view of the arrangement of data in a case in which one bit of attribute is added to each pixel.

Further, when the CMYK data is formed on a pixel-by-pixel basis, as shown in FIG. 7, the CMYK data may be configured such that the attribute map is embedded in a manner adding information of the attribute map to the information of the CMYK data of each pixel. Further, to configure the attribute map so as to prevent an increase in the amount of data, the attribute map may be configured such that it is embedded in any one of the planes of C, M, Y and K, or lower bits of the CMYK data formed on a pixel-by-pixel basis, as shown in FIG. 6. As described above, the format of the attribute map can be determined as required. FIG. 7 shows an example of the image data and the attribute signal formed per pixel, in which the attribute map is held by each of C, M, Y and K, and 2 bits of attribute signal is added to 8 bits of image data of each color.

Figure 8:
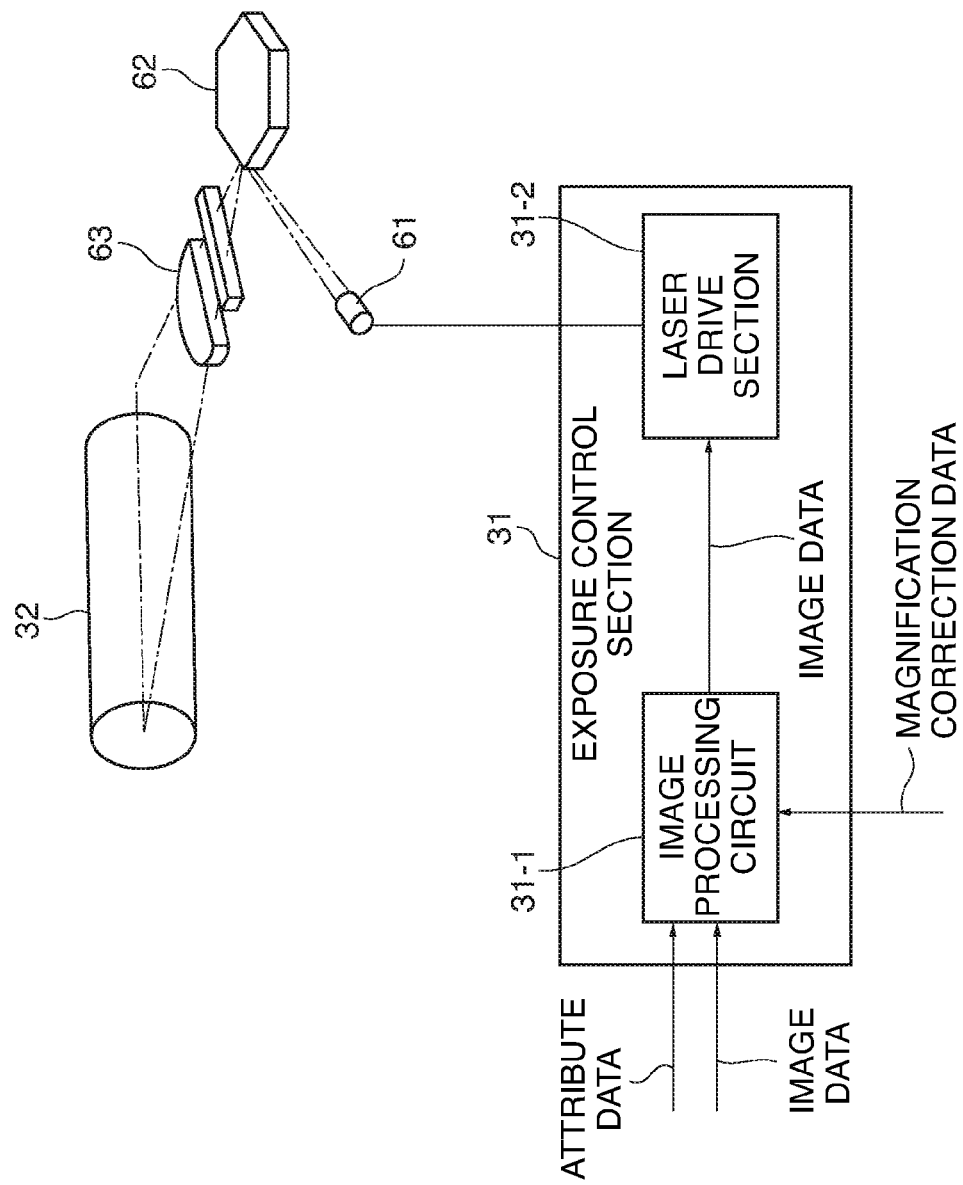
FIG. 8 is a schematic block diagram of an exposure control section of an image forming section of the image forming apparatus, and associated parts

FIG. 8 is a schematic block diagram of the exposure control section 31 of the image forming apparatus 320, and associated parts.

As shown in FIG. 8, the exposure control section 31 is comprised of an image processing circuit 31-1, and a laser drive section 31-2, and corrects the magnification under the control of the control section 340. The image processing circuit 31-1 corrects the magnification in the sub scanning direction based on the image data (image signals) of Y, M, C, and K, the attribute data, and magnification correction data, input from the image processing section 310. Further, the image processing circuit 31-1 corrects the magnification of the image data in the main scanning direction, by synchronizing the image data, which is subjected to pixel division modulation, with an image clock, and outputs the image data to the laser drive section 31-2.

The laser drive section 31-2 drives the semiconductor laser 61 based on the image data subjected to pixel division modulation and input thereto from the image processing circuit 31-1. Within the semiconductor laser 61, there is provided a photodiode sensor (hereinafter referred to as "the PD sensor"), not shown, for detecting part of the laser beams. The laser drive section 31-2 performs APC (Auto Power Control) of the semiconductor laser 61 using a detection signal from the PD sensor. A laser beams emitted from the semiconductor laser 61 is formed into a substantially parallel or collimated beam by an optical system, not shown, including a collimator lens and a diaphragm, and enters the polygon mirror (rotary polyhedral mirror) 62, with a predetermined beam diameter.

The laser beam having entered the polygon mirror 62 is reflected as a deflected beam continuously changing its angle in accordance with rotation of the polygon mirror 62 rotating at a constant angular velocity in a predetermined direction. The laser beam reflected as the deflected beam is subjected to focusing action by an f-θ lens 63. Further, the f-θ lens 63 simultaneously corrects a distortion aberration such that the time linearity of scanning is guaranteed, and therefore the laser beam having passed through the f-θ lens 63 is focused and scanned on the photosensitive drum 32 at a constant speed in a predetermined direction.

A beam detection sensor (hereinafter referred to as "the BD sensor"), not shown, is provided in the vicinity of one end of the photosensitive drum 32, for detecting the laser beam reflected from the polygon mirror 62. A detection signal from the BD sensor is used as a synchronization signal for synchronizing rotation of the polygon mirror 62 with writing of data. In the laser drive section 31-2, to hold constant the amount of laser beam during one scanning, a drive method is employed in which the output from a laser beam is detected by the BD sensor at a light detecting section during one scanning to thereby hold a drive current for driving the semiconductor laser 61 during the one scanning.

Figure 9:
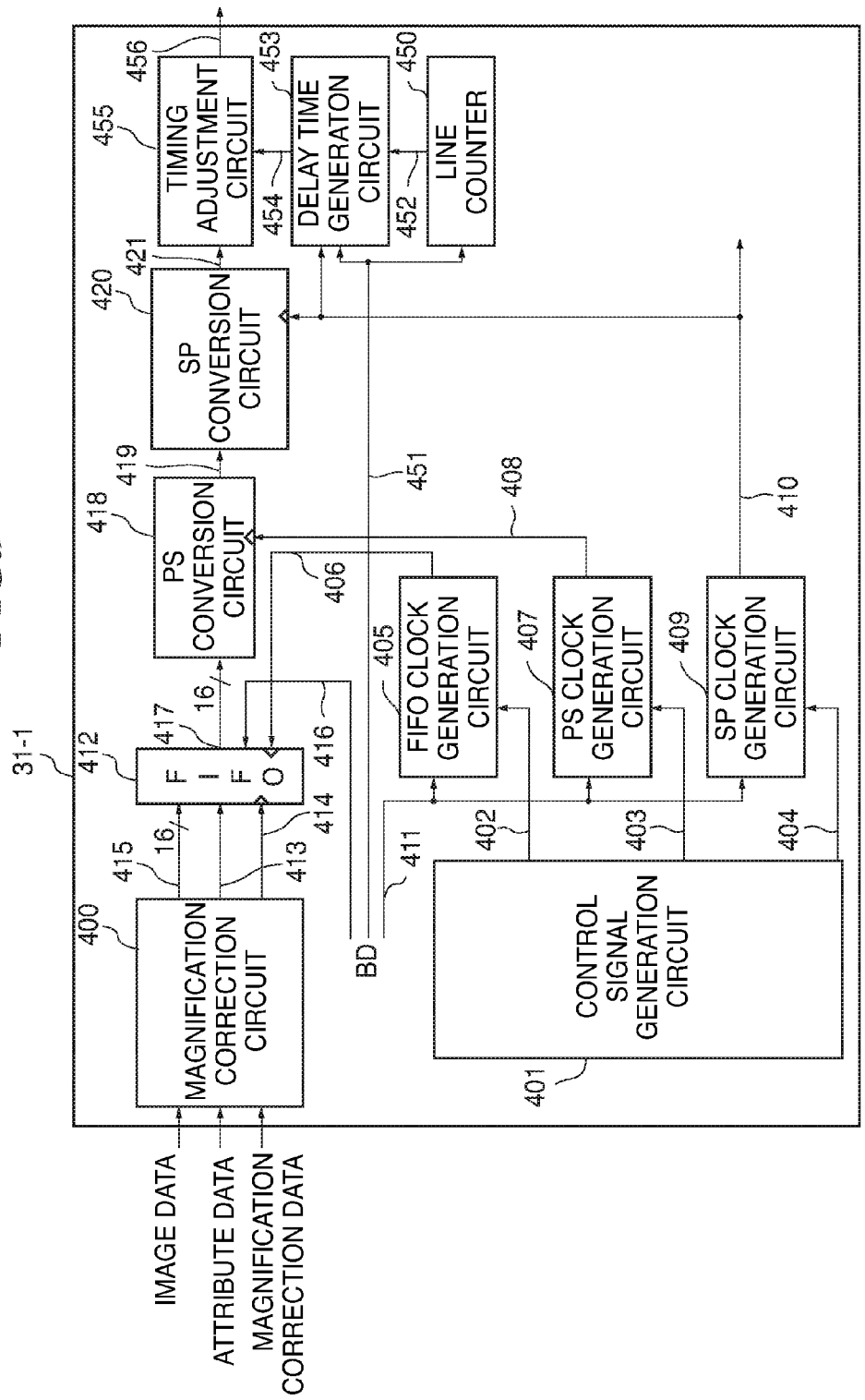
FIG. 9 is a block diagram of an image processing circuit in the exposure control section of the image forming section of the image forming apparatus.

FIG. 9 is a block diagram of the image processing circuit 31-1 in the exposure control section 31 of the image forming section 320 of the image forming apparatus.

As shown in FIG. 9, the image processing circuit 31-1 is comprised of a magnification correction circuit 400, a control signal generation circuit 401, a FIFO (First In-First Out Memory) clock generation circuit 405, and a parallel-serial (hereinafter referred to as "the PS") clock generation circuit 407. Further, the image processing circuit 31-1 includes a serial-parallel (hereinafter referred to as "the SP") clock generation circuit 409, a FIFO 412, a PS conversion circuit 418, an SP conversion circuit 420, a line counter 450, a delay time generation circuit 453, and a timing adjustment circuit 455.

The magnification correction circuit 400 corrects the magnification based on the image data, the attribute data, and the magnification correction data, sent from the image processing section 310. In the present embodiment, the magnification correction circuit 400 calculates the expansion/contraction ratio of a recording sheet based on the size of the recording sheet detected by a sensor, not shown, before the toner image is heat-fixed thereon, and the size thereof detected after the toner image has been heat-fixed thereon, and corrects the magnification based on the expansion/contraction ratio. The magnification correction data gives an instruction for correction (reduction correction/expansion correction) of the magnification of an image. In an example illustrated in FIG. 10, with reference to which the magnification correction process is described hereinafter, the magnification correction data instructs 1% of reduction correction. The same applies to the expansion correction. It should be noted that the expansion/contraction ratio of the recording sheet may be calculated by either the control section 340 or the image processing section 310.

The control signal generation circuit 401 generates a FIFO control signal 402 for the FIFO clock generation circuit 405, a PS conversion control signal 403 for the PS clock generation circuit 407, and an SP conversion control signal 404 for the SP clock generation circuit 409. The FIFO clock generation circuit 405 generates a read clock 406 for the FIFO 412 based on a reference clock 411 and the FIFO control signal 402.

The PS clock generation circuit 407 generates a PS conversion clock 408 for the PS conversion circuit 418 based on the reference clock 411 and the PS conversion control signal 403. The SP clock generation circuit 409 generates an SP conversion clock 410 for the SP conversion circuit 420 based on the reference clock 411 and the SP conversion control signal 404. Further, the SP conversion clock 410 is output as an image clock.

The FIFO 412 is supplied with a FIFO write address reset signal 413 and a write clock 414 from the control section 340, and receives an image signal indicative of each pixel and delivered from an image-generating section, not shown, e.g. of the host computer 10. More specifically, 16-bit write pixel data 415 is input to the FIFO 412. A 16-bit read pixel data 417 is output from the FIFO 412 in response to the read clock 406 input from the FIFO clock generation circuit 405 and a read address reset signal 416 input from the control section 340. The read pixel data 417 output from the FIFO 412 is input to the PS conversion circuit 418.

The PS conversion circuit 418 converts the input 16-bit read pixel data 417 into a serial pixel signal 419 according to the PS conversion clock 408, and outputs the serial pixel signal 419. The serial pixel signal 419 is input to the SP conversion circuit 420. The SP conversion circuit 420 converts the input serial pixel signal 419 into a 16-bit parallel pixel signal 421, and outputs the parallel pixel signal 421.

The line counter 450 counts a BD signal 451 output from the BD sensor, not shown, and outputs a line select signal 452 circulating in units of e.g. 4 lines. The delay time generation circuit 453 generates four kinds of delay times 454 in synchronism with the SP conversion clock 410 in association with the line select signal 452. The timing adjustment circuit 455 causes the parallel pixel signal 421 to be delayed on a line-by-line basis according to the delay time 454, and outputs the same as image data 456.

Next, the magnification correction executed by the image forming apparatus according to the present embodiment will be described with reference to a flowchart shown in FIG. 10.

FIG. 10 is the flowchart of the magnification correction process executed by the image forming apparatus.

As shown in FIG. 10, when the control section 340 of the image forming apparatus determines that the start of a printing operation has been instructed by an operator (step S1001), the control section 340 determines whether or not front surface printing for forming an image on the front surface of a recording sheet has been instructed (step S1002). If the control section 340 determines in the step S1002 that the front surface printing has been instructed, it causes the image forming section 320 to perform image formation (front surface printing) in which a toner image is transferred to the front surface of a recording sheet (step S1003). Further, the control section 340 causes a fixing operation to be performed for fixing the toner image on the recording sheet (step S1004), followed by terminating the front surface printing (step S1005).

If the control section 340 determines in the step S1002 that the front surface printing has not been instructed, the control section 340 determines whether or not back surface printing for forming an image on the back surface of the recording sheet has been instructed (step S1006). If the control section 340 determines in the step S1006 that the back surface printing has been instructed, it causes the exposure control section 31 of the image forming section 320 to start magnification correction (step S1007). First, the control section 340 determines, on a pixel-by-pixel basis, based on image data and attribute data transmitted from the image processing section 310 whether or not the image data belongs to a character margin portion, using the image area-separating section 107 (step S1008).

If the control section 340 determines in the step S1008 that the image data belongs to the character margin portion, the control section 340 determines whether or not image data transmitted from the image processing section 310 belongs to a line for magnification correction (step S1009). In the present embodiment, when the magnification is corrected, it is assumed that 1% of reduction correction is performed e.g. on image data on a A4-size sheet having a lateral length of 210 mm. Supposing that the pixel size of the image data is 600 dpi (42.3 µm), to put it simply, there are 4964 lines of data, and 49 lines corresponding to 1% of the 4964 lines are corrected.

If the control section 340 determines in the step S1009 that the current image data is of a line for magnification correction, the control section 340 causes the exposure control section 31 to thin out pixel data to correct the magnification of the image data such that it becomes equal to a desired (specified) value (step S1010), followed by terminating the magnification correction (step S1011). The control section 340 repeatedly causes the exposure control section 31 to carry out the above-mentioned magnification correction. Similarly to the front surface printing, the control section 340 causes the image formation (back surface printing) to be performed by transferring a toner image to the back surface of the recording sheet (step S1003), and the fixing operation to be executed (step S1004), followed by terminating the back surface printing (step S1005).

FIG. 11A is a view which is useful in explaining the magnification correction carried out when the size of an image is reduced by the reduction correction, and FIG. 11B is a view which is useful in explaining the magnification correction carried out when the size of an image is increased by the expansion correction.

In FIG. 11A, alphabetical portions, rectangular portions, and white portions represent character portions, photograph portions, and character margin portions, respectively. As shown in FIG. 11A, in the image reduction, it is possible to reduce the size of an image to correct the magnification thereof, by thinning out lines of the character margin portions.

Similarly, in FIG. 11B, alphabetical portions, rectangular portions, and white portions represent character portions, photograph portions, and character margin portions, respectively. As shown in FIG. 11B, in the image expansion, it is possible to expand the size of an image to correct the magnification thereof, by inserting lines into the character margin portions.

It should be noted that although in the present embodiment, the magnification is corrected by the exposure control section 31 of the image forming section 320, by way of example, this is not limitative, but the correction of the magnification by the image processing section 310 brings about no problems. To carry out the magnification correction process by the image processing section 310, as shown in FIG. 12, it is only required to provide the magnification correction circuit 400 in the image processing section 310. When this configuration is employed, the image processing circuit 31-1 of the exposure control section 31 can be dispensed with. In this case, the exposure control section 31 can write an image by receiving image data from the image processing section 310 to perform a predetermined process by the laser drive section 31-2.

As described hereinabove, according to the present embodiment, during the back surface printing, the control section 340 determines using the image area-separating section 107 whether or not image data transmitted from the image processing section 310 belongs to a character margin portion. If the control section 340 determines that the image data belongs to the character margin portion, it further determines whether or not the image data is of a line for magnification correction. When determining that the image data is of a line for magnification correction, the control section 340 causes the exposure control section 31 to thin out pixel data to thereby correct the magnification of the image data such that it becomes equal to a desired value. This makes it possible to accurately correct the magnification of an image particularly in the sub scanning direction without degrading the quality of the formed image, thereby making it possible to cope with increase in the operating speed without causing degradation of productivity.

An image forming apparatus according to a second embodiment of the present invention is distinguished from the above-described first embodiment in that an image processing section thereof is configured as described hereinafter. The other component elements in the present embodiment are identical to the corresponding ones in the first embodiment (see FIGS. 1 and 2), and hence description thereof is omitted while designating the component elements by the same reference numerals.

In the above-described first embodiment, the method of separating image data into image areas and performing the magnification correction according to the results of separation of the image data has been described. In contrast, in the present embodiment, a description will be given of a method of performing the magnification correction without separating image data into image areas.

Figure 13:
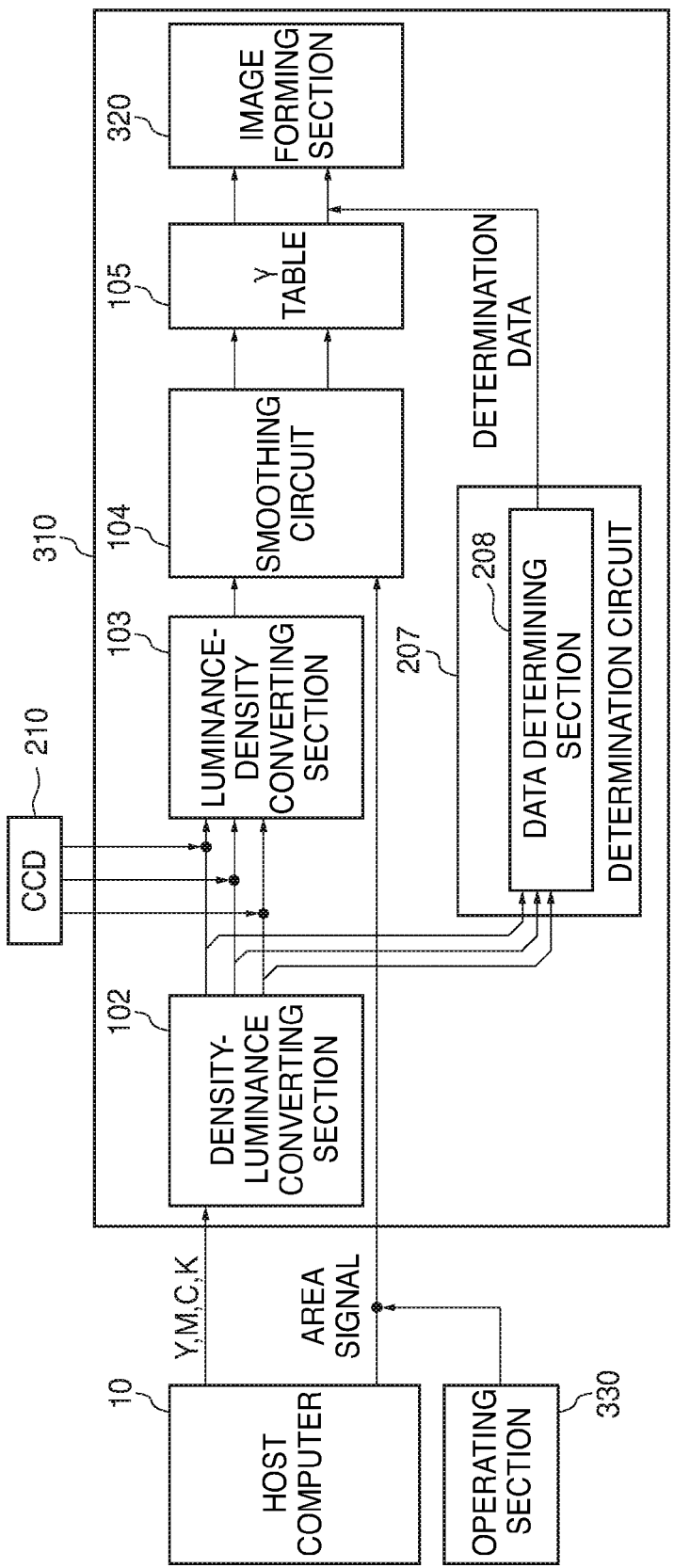
FIG. 13 is a block diagram of an image processing section of an image forming apparatus according to a second embodiment, and associated parts.

FIG. 13 is a schematic block diagram of the image processing section 310 of the image forming apparatus according to the present embodiment, and associated parts.

Referring to FIG. 13, the image processing section 310 is comprised of the density-luminance converting section 102, the luminance-density converting section 103, the smoothing circuit 104, the γ table 105, and a determination circuit 207. The image processing section 310 according to the present embodiment has the same basic construction as that of the above-described image processing section according to the first embodiment, and hence only different points from the first embodiment will be described.

Although in the above-mentioned first embodiment, the image processing section 310 includes the image area-separating section 107, in the present embodiment, the image processing section 310 includes the determination circuit 207. The determination circuit 207 has a data determining section 208 that determines whether or not image data exists, and sends determination data formed based on the determination to the image forming section 320. When the image forming section 320 receives the determination data, the exposure control section 31 of the image forming section 320 performs magnification correction on portions without the image data (margin portions) based on the determination data.

Figure 14:
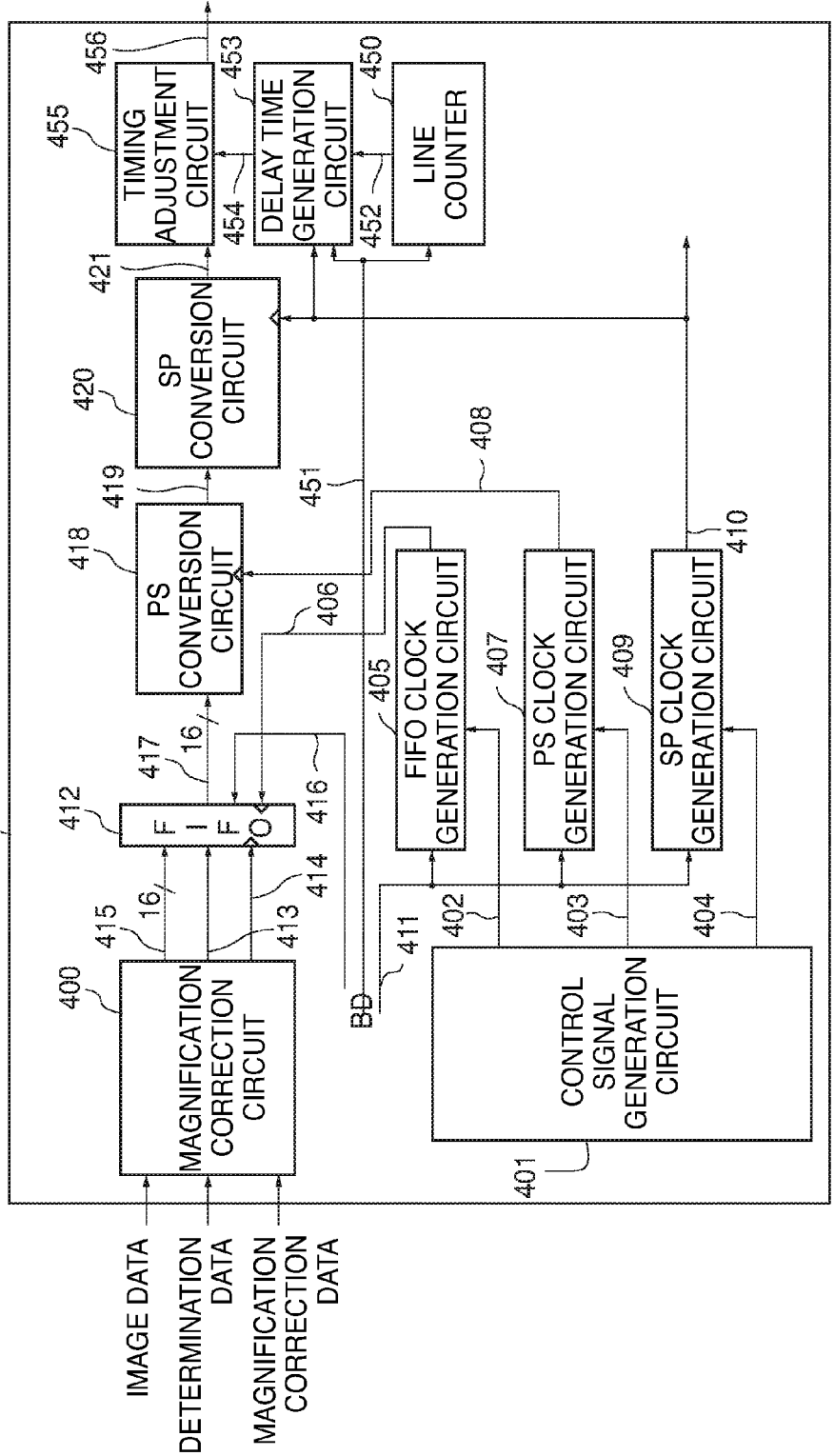
FIG. 14 is a block diagram of an image processing circuit of an exposure control section of an image forming section of the image forming apparatus.

FIG. 14 is a block diagram of the image processing circuit 31-1 in the exposure control section 31 of the image forming section 320 of the image forming apparatus.

As shown in FIG. 14, the image processing circuit 31-1 is comprised of the magnification correction circuit 400, the control signal generation circuit 401, the FIFO 412, the PS conversion circuit 418, the SP conversion circuit 420, the timing adjustment circuit 455, and so forth. The image processing circuit 31-1 according to the present embodiment has the same basic construction as that of the image processing circuit of the first embodiment, and hence only different points from the first embodiment will be described.

Although in the above-described first embodiment, image data, attribute data, and magnification correction data are sent from the image processing section 310 to the image processing circuit 31-1, in the present embodiment, image data, determination data, and magnification correction data are sent from the image processing section 310 to the image processing circuit 31-1. The magnification correction circuit 400 performs magnification correction based on the image data, the determination data, and the magnification correction data sent from the image processing section 310.

Next, the magnification correction executed by the image forming apparatus according to the present embodiment will be described with reference to a flowchart shown in FIG. 15.

Figure 15:
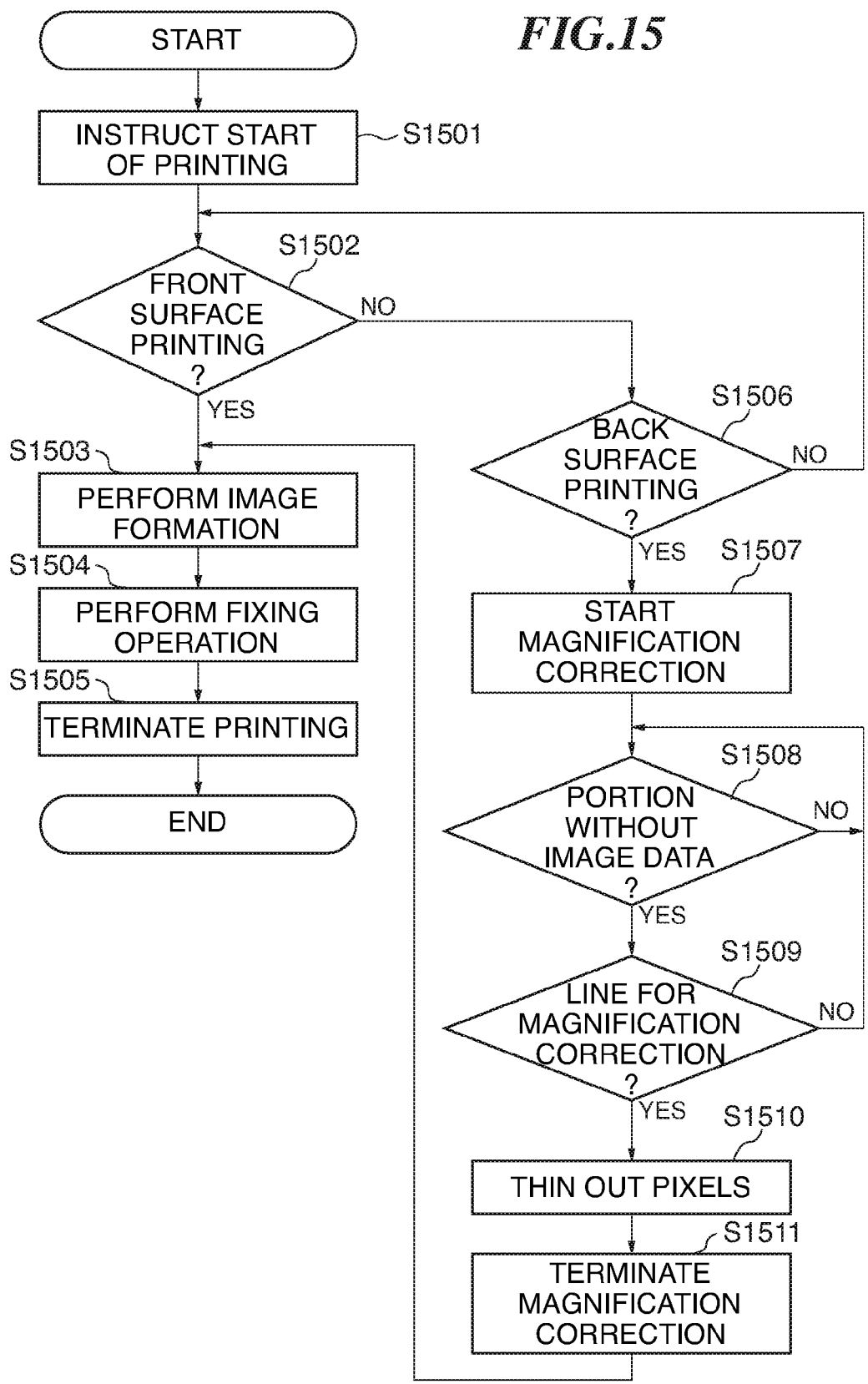
FIG. 15 is a flowchart of a magnification correction process executed by the image forming apparatus.

FIG. 15 is a flowchart of a magnification correction process executed by the image forming apparatus.

As shown in FIG. 15, when the control section 340 of the image forming apparatus determines that the start of a printing operation has been instructed by an operator (step S1501), the control section 340 determines whether or not front surface printing for forming an image on the front surface of a recording sheet has been instructed (step S1502). If the control section 340 determines in the step S1502 that the front surface printing has been instructed, the control section 340 causes the image forming section 320 to form an image (perform the front surface printing) by transferring a toner image onto the front surface of the recording sheet (step S1503). Further, the control section 340 causes a fixing operation to be performed for fixing the toner image on the recording sheet (step S1504), followed by terminating the front surface printing (step S1505).

If the control section 340 determines in the step S1502 that the front surface printing has not been instructed, the control section 340 determines whether or not back surface printing for forming an image on the back surface of the recording sheet has been instructed (step S1506). If the control section 340 determines in the step S1506 that the back surface printing has been instructed, the control section 340 causes the exposure control section 31 of the image forming section 320 to start correct magnification (step S1507). First, the control section 340 determines based on image data and determination data transmitted from the image processing section 310, whether or not image data exists (step S1508).

If the control section 340 determines in the step S1508 that there exists no image data (margin portions), the control section 340 determines whether or not image data transmitted from the image processing section 310 is of a line for magnification correction (step S1509). In the present embodiment, when the magnification is corrected, it is assumed that 1% of reduction correction is performed e.g. on image data on a A4-size sheet having a lateral length of 210 mm. Supposing that the pixel size of the image data is 600 dpi (42.3 µm), to put it simply, there exist 4964 lines of data, and 49 lines corresponding to 1% of the 4964 lines are corrected.

If the control section 340 determines in the step S1509 that the image data is of a line for magnification correction, the control section 340 causes the exposure control section 31 to thin out pixel data to thereby correct the magnification of the image data such that it becomes equal to a desired value (step S1510), followed by terminating the magnification correction (step S1511). The control section 340 repeatedly causes the exposure control section 31 to carry out the above-mentioned magnification correction. Similarly to the front surface printing, the control section 340 also causes the image formation (back surface printing) to be performed by transferring a toner image onto the back surface of the recording sheet (step S1503), and the fixing operation to be executed (step S1504), followed by terminating the back surface printing (step S1505).

As described hereinabove, according to the present embodiment, during the back surface printing, the control section 340 determines by the image area-separating section 107 whether or not image data exists. If the control section 340 determines that there exists no image data, the control section 340 determines whether or not the image data is of a line for magnification correction. When determining that the image data is of a line for magnification correction, the control section 340 thins out pixel data by the exposure control section 31, and corrects the magnification of the image data such that it becomes a desired value. This makes it possible to accurately correct the magnification of an image particularly in the sub scanning direction without degrading the quality of the formed image, thereby making it possible to cope with increase in the operating speed without causing degradation of productivity.

Although in the above-described first and second embodiments, the magnification is corrected by thinning or inserting lines from or into the character margin portions, by way of example, this is not limitative, but the magnification correction may be carried out by thinning or inserting pixels from or into the character margin portions on a pixel-by-pixel basis.

Further, although in the above-described first and second embodiments, the magnification is corrected by thinning or inserting lines from or into the character margin portions between characters, by way of example, this is not limitative, but the present invention can also be applied to a case where the magnification is corrected by thinning or inserting lines from or into margin portions (e.g. between characters and photographs) other than the character margin portions.

Further, although in the above-described first and second embodiments, 1% of reduction correction is performed as the magnification correction, by way of example, this is not limitative, but the ratio of the reduction correction can be changed as required. The same applies to the expansion correction.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-318656 filed Nov. 27, 2006, which is hereby incorporated by reference herein in its entirety.

What is claimed is:

1. An image forming apparatus comprising:
   a rotational image carrier;
   an image forming unit configured to form a latent image on the image carrier in a main scanning direction substantially perpendicular to a rotational direction of the image carrier, to develop the latent image as a toner image, and to transfer the toner image onto a recording medium, to thereby form an image on the recording medium;
   a determining unit configured to determine a position of a margin region, on which the toner image is not formed in the main scanning direction with respect to a rotational direction of the image carrier, based on input image data; and
   a magnification correcting unit configured to correct the input image data in order to correct magnification of the image with respect to the rotational direction of the image carrier,
   wherein the magnification correcting unit is configured to increase a width of the margin region with respect to the rotational direction of the image carrier in order to expand the magnification of the image with respect to the rotational direction of the image carrier, and to reduce the width of the margin region with respect to the rotational direction of the image carrier in order to reduce the magnification of the image with respect to the rotational direction of the image carrier.

2. The image forming apparatus as claimed in claim 1, further comprising a calculation unit configured to calculate an expansion/contraction ratio of the recording medium based on a size of the recording medium before the image is heat-fixed on the recording medium, and the size of the recording medium after the image has been heat-fixed on the recording medium,
   wherein said magnification correcting unit is configured to correct the magnification based on the expansion/contraction ratio calculated by said calculation unit.

3. The image forming apparatus as claimed in claim 1, wherein the magnification correcting unit is configured to determine whether or not the margin region, the position of which is determined by the determining unit, is to be magnification corrected, and to correct the input image data corresponding to the margin region in a case where the margin region, the position of which determined by the determining unit, is to be magnification corrected.

4. A method of controlling an image forming apparatus including a rotational image carrier, the method comprising:
   an image forming step of forming a latent image on the image carrier in a main scanning direction substantially perpendicular to a rotational direction of the image carrier, developing the latent image as a toner image, and transferring the toner image onto a recording medium, to thereby form an image on the recording medium;
   a determining step of determining a position of a margin region, on which the toner image is not formed in the main scanning direction with respect to a rotational direction of the image carrier, based on input image data; and
   a magnification correction step of correcting the input image data in order to correct magnification of the image with respect to the rotational direction of the image carrier,
   wherein the magnification correcting step includes increasing a width of the margin region with respect to the rotational direction of the image carrier in order to expand the magnification of the image with respect to the rotational direction of the image carrier, and reducing the width of the margin region with respect to the rotational direction of the image carrier in order to reduce the magnification of the image with respect to the rotational direction of the image carrier.

* * * * *